United States Patent

Skrzypek et al.

[11] Patent Number: 5,803,530
[45] Date of Patent: Sep. 8, 1998

[54] CONVERTIBLE HAVING A WIND DEFLECTING DEVICE

[75] Inventors: Uwe Skrzypek, Bad Oeynhausen; Andreas Zapatinas, Munich, both of Germany

[73] Assignee: Bayerishe Motoren Werke Aktiengesellschaft, Munich, Germany

[21] Appl. No.: 718,934

[22] Filed: Sep. 24, 1996

[30] Foreign Application Priority Data

Sep. 25, 1995 [DE] Germany .................. 195 35 593.8

[51] Int. Cl.$^6$ ............................................. B60J 7/22
[52] U.S. Cl. .................. 296/180.1; 296/136; 296/37.16; 296/85
[58] Field of Search ............................ 296/180.1, 180.5, 296/85, 136, 96.2, 37.16; 280/756

[56] References Cited

U.S. PATENT DOCUMENTS

| 2,747,928 | 5/1956 | Oliver et al. ................. 296/136 X |
| 3,170,726 | 2/1965 | Lystad ........................... 296/136 |
| 4,783,113 | 11/1988 | Padlo ............................. 296/136 |
| 4,799,729 | 1/1989 | Muscat ........................... 296/85 |
| 5,211,718 | 5/1993 | Gotz et al. ................. 296/37.16 X |
| 5,318,337 | 6/1994 | Gotz et al. .................... 296/180.5 |
| 5,573,296 | 11/1996 | Lienenkamp .................... 296/136 |

FOREIGN PATENT DOCUMENTS

| 0599811A1 | 6/1994 | European Pat. Off. . |
| 3935630A1 | 5/1991 | Germany . |
| 3939145 | 5/1991 | Germany .................... 296/136 |
| 19215189 U | 2/1993 | Germany . |
| 4311240C1 | 4/1994 | Germany . |
| 4338102A1 | 5/1995 | Germany . |

OTHER PUBLICATIONS

Search Report Nov. 6, 1996, Europe.
Search Report Jan. 9, 1996, Germany.

*Primary Examiner*—Joseph D. Pape
*Attorney, Agent, or Firm*—Evenson McKeown Edwards & Lenahan PLLC

[57] ABSTRACT

The convertible has a wind deflecting device which is arranged on a folding-top compartment lid swivellably about a transverse axis. In the inoperative position, the wind deflecting device is situated on the top side of the folding-top compartment lid and can be swivelled from there into an operative position which is directed upward beyond the elbow line of the convertible. In the inoperative position, the wind deflecting device is integrated largely into the contour of the folding-top compartment lid. On the one hand, the wind deflecting device can therefore be handled in an easy manner and, on the other hand, can also be integrated well into the vehicle from an aesthetic point of view.

13 Claims, 3 Drawing Sheets

CONVERTIBLE HAVING A WIND DEFLECTING DEVICE

BACKGROUND AND SUMMARY OF THE INVENTION

This invention relates to a convertible having a wind deflecting device which is arranged on a folding-top compartment lid and can be swivelled about a transverse axis from an inoperative position on a top side of a folding-top compartment lid into an upward directed operative position.

A known wind deflecting device of this type (German Patent Document DE 39 35 630 A1) comprises a screen as a solid body on whose one side headrests for the rear seats are also constructed. Perpendicularly to the plane of the folding top compartment lid, this causes a high space requirement and, in addition, makes an elegant stylistic integration of the wind deflecting device into the vehicle more difficult.

It is also known (German Patent Document DE 43 11 240 C1) to dispose a two-part wind protection device on the underside of a folding top compartment lid. The displacement of the wind protection device from its inoperative position into the operative position and back is complicated and in each case requires an opening of the folding-top compartment lid.

Another known wind protection device (European Patent Document EP 0 599 811 A1) is arranged between the legs of the folding-top compartment lid which is customarily U-shaped in the top view. It also consists of two parts, specifically of a horizontal covering which can be swivelled about a rear transverse axis and of the actual wind protection devices which can be swivelled from a position below the covering into an upwardly directed operative position. In the operative position, the wind protection device is fixed by the covering. The two parts each have a frame by means of which nets are mounted which keep away a large portion of the wind but let a small portion pass through. In the case of the previously known wind protection device, the handling is also complicated because the covering must first be swivelled upward; then the wind protection device must also be swivelled upward; and finally the fixing of the wind protection device must be carried out by the covering. A stylistically elegant integration into the folding-top compartment lid also does not exist.

It is an object of the invention to provide a convertible with a wind deflecting device of the initially mentioned construction in the case of which an unobtrusive and nevertheless stylistically attractive wind deflecting device can be obtained which is simple to handle when in use.

According to the invention, this object is achieved according to certain preferred embodiments by providing an arrangement wherein the wind deflecting device is integrated largely into the contour of the folding-top compartment lid in the inoperative position.

According to certain preferred embodiments this object is also achieved by arrangements wherein the folding-top compartment lid is divided into a center lid section swivellably disposed on the vehicle body and two lateral releasable lid parts, the wind deflecting device being swivellably arranged on the center lid section.

In the inoperative position, the new wind deflecting device does not project beyond the contour of the folding-top compartment lid. In contrast perhaps to a customary canvas, the folding-top compartment lid can be constructed to be dimensionally stable and—even when it is provided with the new wind deflecting device—permits a good aesthetic appearance of the convertible. An additional storage space for storing the wind deflecting device, which is sparse in the case of a convertible, is not required. The wind deflecting device is easy to handle because when needed it only has to be swivelled upwards. When it is to be returned into the inoperative position, a simple pressing back in the direction of the folding-top compartment lid is sufficient until it rests on its surface by means of the net and until the frame of the wind deflecting device is accommodated in corresponding indentations of the folding-top compartment lid.

Other objects, advantages and novel features of the present invention will become apparent from the following detailed description of the invention when considered in conjunction with the accompanying drawings.

DETAILED DESCRIPTION OF THE DRAWINGS

Figure 1:
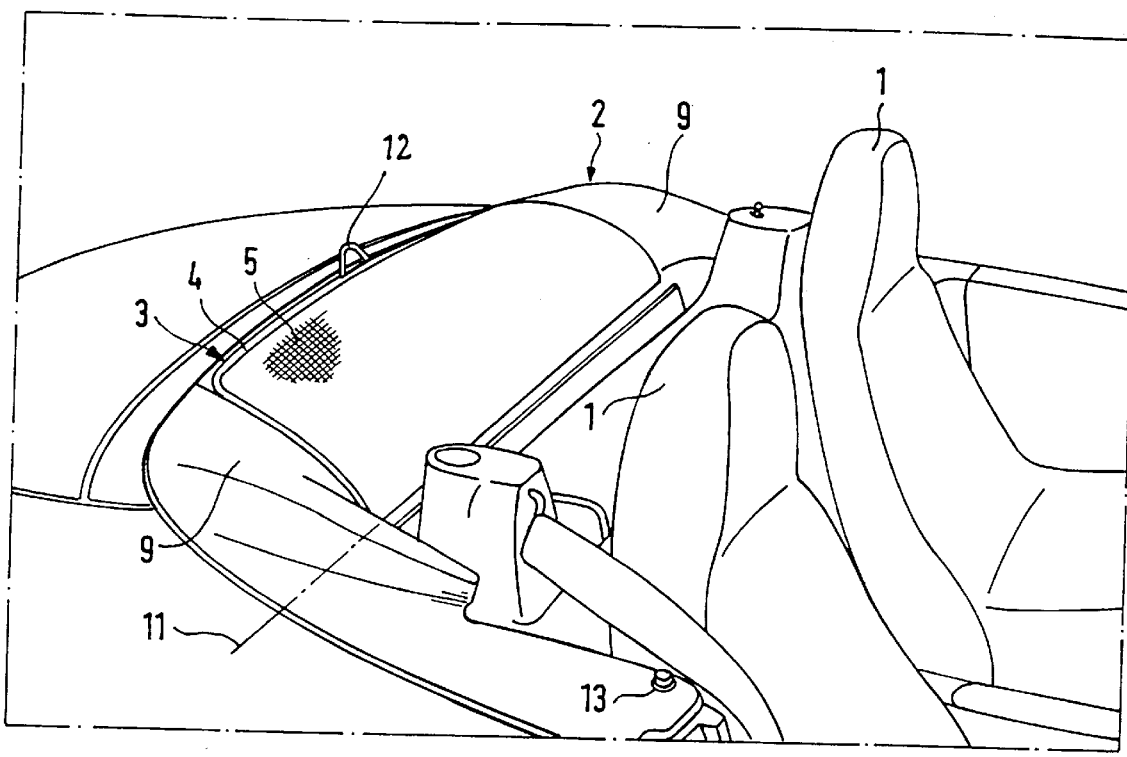
FIG. 1 is a perspective view of the area of a convertible situated behind the seats when the folding top is opened up and lowered and when the wind deflecting device is in the inoperative position, constructed according to a preferred embodiment of the present invention.

The drawing partially shows a convertible constructed as a roadster, in the case of which a folding-top compartment lid 2 is provided at a relatively short distance behind the two seats 1. The convertible also has a wind deflecting device 3 which deflects the air flow which is directed from the rearward vehicle section against the passengers and is felt to be very annoying but lets a smaller - desired - amount pass through. FIG. 1 of the drawing shows the wind deflecting device 3 in its inoperative position in which it is largely arranged on the top side of the folding-top compartment lid 2.

Figure 2:
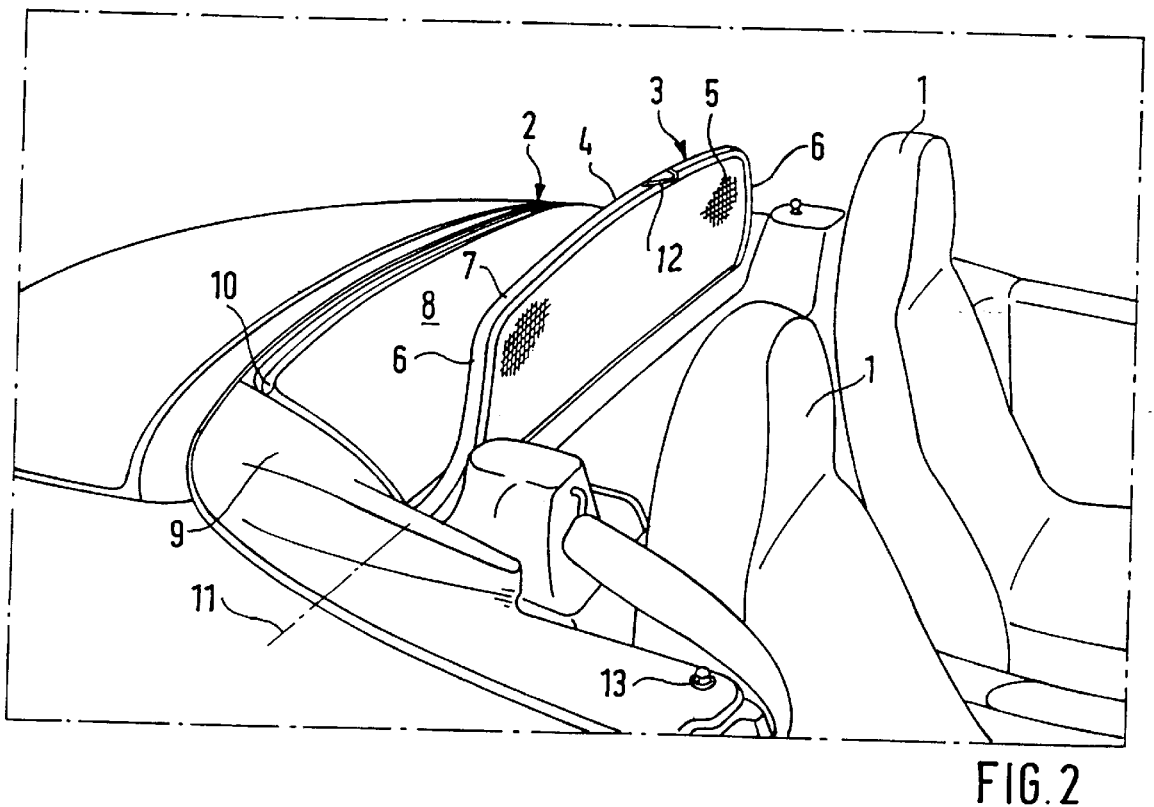
FIG. 2 is a view which corresponds to FIG. 1 but showing the wind deflecting device in its upright operative position.

In FIG. 2, the wind deflecting device 3 is illustrated in its upwardly directed operative position in which it projects beyond the elbow line or belt line of the open convertible in the upward direction. In order to be able to displace the wind deflecting device 3 into the operative position and back into the inoperative position, it can be swivelled about a transverse axis which cannot be seen in detail and which, in the inoperative position, extends in the forward edge area of the wind deflecting device 3.

As illustrated particularly in FIG. 1, the wind deflecting device 3 is integrated in the inoperative position largely into the contour of the folding-top compartment lid 2. In the case of the illustrated embodiment, the wind deflecting device 3 comprises a frame 4 by means of which a net 5 is mounted with a defined air permeability and which, in the inoperative position (FIG. 1) is lowered into the folding-top compartment lid 2. The folding-top compartment lid 2 has a spherically curved surface. The frame parts 6 and 7 are also curved in a corresponding manner. As illustrated, the net 5 of the wind deflecting device 3 swivelled into the operative position (FIG. 2) is also slightly curved toward the front, allowing an aerodynamic optimization. Furthermore, in the folded-back inoperative position, the wind deflecting device 3 is harmonically adapted to the outside of the folding-top compartment lid 2 which is also optimized with respect to design aspects. Finally, also for storing the wind deflecting device 3 in its inoperative position, very little space is required. By way of the material of the net 5 and its color, interesting design effects can be produced.

In the particularly preferred embodiment, the folding-top compartment lid 2 is divided into a center lid section 8, which is swivellably disposed on the vehicle body, and into two lateral releasable lid parts 9. In this case, the wind deflecting device 3 is swivellably arranged on the center lid section 8. FIG. 2 also shows that the center lid section 8 has on its free edge areas an indentation 10 for accommodating the frame 4 of the wind deflecting device 3.

Figure 3:
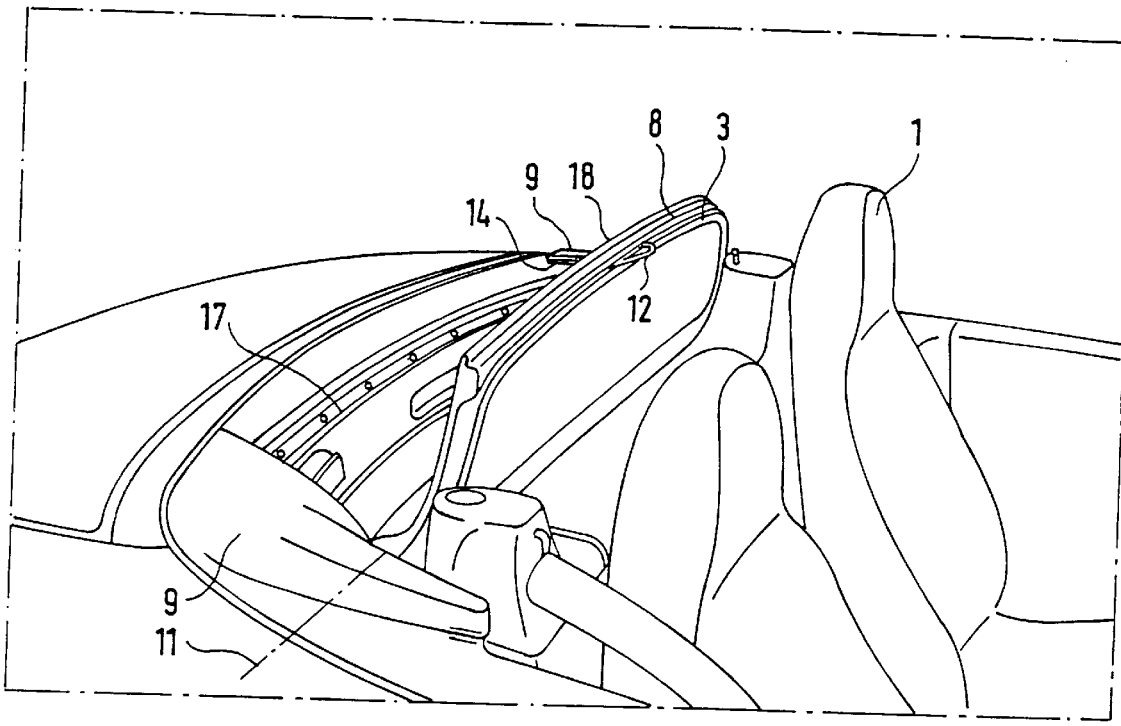
FIG. 3 is a view which also corresponds to FIG. 1 but with an opened center part of the folding-top compartment.
Figure 4:
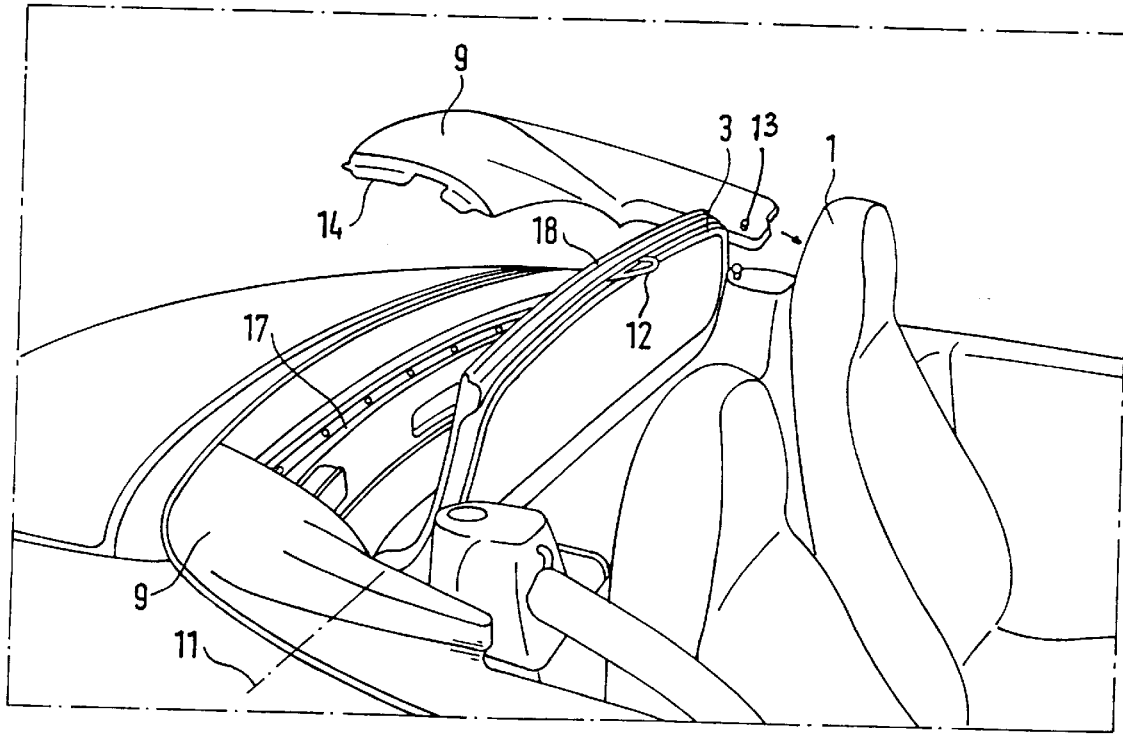
FIG. 4 is a view which corresponds to FIG. 3 but while the left side part of the folding-top compartment lid is removed.
Figure 5:
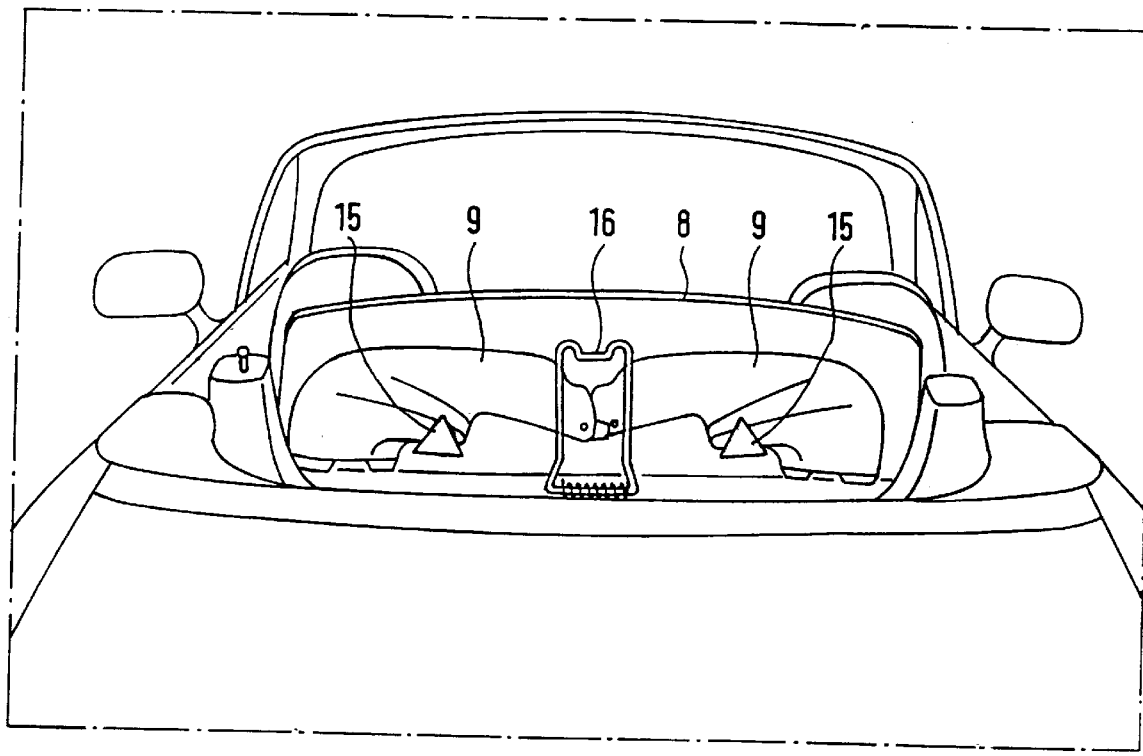
FIG. 5 is a rear view of the convertible while the center part of the folding-top compartment lid is open and the side parts are stored on it.

The above-mentioned division of the folding-top compartment lid 2 is shown particularly in FIGS. 3 to 5, according to which the center lid section 8 can be swivelled about a transverse axis 11 with respect to the vehicle body which is provided on its forward edge area and is only outlined in the drawing. In contrast, conventional folding-top compartment lids can be swivelled upward about a transverse axis which is situated on their rearward edge area.

The wind deflecting device 3 can also be swivelled about a transverse axis with respect to the lid section which is situated on the forward edge area of the lid section 8. Preferably, the lid section 8 and the wind deflecting device 3 have a common swivel axis, specifically the indicated transverse axis 11.

On the transversely extending frame part 7 of the frame 4 of the wind deflecting device 3, a handle 12 is arranged for swivelling the wind deflecting device 3. In the illustrated embodiment, the handle 12 is a flat loop which, in the inoperative position of the wind deflecting device 3, points slightly upward beyond the vehicle contour. Also during the drive, this loop can easily be gripped by the driver or, if required, can easily be felt without the requirement that the driver has to look and his attention is unnecessarily diverted. For the swivelling-back, the wind deflecting device 3 is only pressed by means of its frame 4 into the above-mentioned indentation 10 of the center lid section 8 and remains there under the effect of frictional forces or detent elements which can easily be overcome.

Each lateral lid part 9 is held in position on one end area by adjoining vehicle parts and is fixed on the other end area on the vehicle body by means of a releasable detent connection 13. The releasable detent connection 13 can comprise, for example, a conventional so-called Tenax button.

In the illustrated embodiment, the detent connection 13 is provided on the forward end area of each lateral lid part 9.

On their rearward end, the releasable lid parts 9 each have at least one inwardly directed lengthening 14 which is shown particularly in FIG. 4 but also in FIG. 3. By way of the lengthenings 14, the lateral lid parts 9 are loaded downwardly by the adjoining edges of the closed center lid section 8 and—in connection with the above-mentioned detent connection 13—therefore held on the vehicle body. In the curved rearward end area, each lateral lid part 9 can also be provided with projections which correspond approximately to the lengthenings 14 and reach under corresponding recesses in the vehicle body.

FIG. 5 finally shows that the center lid section 8, which is illustrated in FIG. 5 in the open position, has holding elements on its back side for storing the lateral lid parts 9. The holding elements may consist, for example, of upwardly directed holding tongues 15 as well as of a bow 16 which rests resiliently against the lid parts 9 and can be swivelled away.

When the folding top 17 illustrated in FIGS. 3 and 4 only by means of a few frame parts is closed, the center lid part 8 is in its upright position in which it can remain also after the closing of the folding top 17. However, before the final closing of the folding top, the center lid section 8 can also be brought into its closed position. In the latter position, when the folding top is closed, the rearmost folding-top section of the folding top 17 reaches partially over an edge 18 projecting in the rear on the center lid section 8.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Convertible having a folding-top compartment lid and a wind deflecting device which is arranged on the folding-top compartment lid and can be swivelled about a transverse axis from an inoperative position on a top side of the folding-top compartment lid into an upwardly directed operative position, wherein the wind deflecting device is integrated largely into the contour of the folding-top compartment lid in the inoperative position, and wherein the wind deflecting device includes a frame which mounts a net, said frame being lowered into the folding-top compartment lid in the inoperative position.

2. Convertible having a folding-top compartment lid and a wind deflecting device which is arranged on the folding-top compartment lid and can be swivelled about a transverse axis from an inoperative position on a top side of the folding-top compartment lid into an upwardly directed operative position, wherein the wind deflecting device is integrated largely into the contour of the folding-top compartment lid in the inoperative position, and wherein the wind deflecting device includes a net, said net being curved toward the front when swivelled into the operative position.

3. Convertible according to claim 2, wherein the folding-top compartment lid has a spherically curved surface and the frame has frame parts which are curved correspondingly.

4. Convertible according to claim 1, wherein the compartment lid includes a center lid section, said center lid section having an indentation for accommodating the frame of the wind deflecting device on free edge areas of the center lid section.

5. Convertible according to claim 1, wherein the frame includes a transversely extending lid frame part, and wherein a handle for swivelling the wind deflecting device is arranged on the transversely extending lid frame part.

6. Convertible according to claim 5, wherein the handle is a loop which points upward in the inoperative position of the wind deflecting device.

7. Convertible having a folding top compartment lid and a wind deflecting device which is arranged on the folding-top compartment lid and can be swivelled about a transverse axis from an inoperative position from a top side of the folding-top compartment lid into an upwardly directed operative position, wherein the folding-top compartment lid is divided into a center lid section swivellably disposed on the vehicle body and two lateral releasable lid parts, the wind deflecting device being swivellably arranged on the center lid section, wherein the wind deflecting device includes a frame, wherein the frame includes a transversely extending frame part, and wherein a handle for swivelling the wind deflecting device is arranged on the transversely extending frame part.

8. Convertible having a folding top compartment lid and a wind deflecting device which is arranged on the folding-top compartment lid and can be swivelled about a transverse axis from an inoperative position from a top side of the folding-top compartment lid into an upwardly directed operative position, wherein the folding-top compartment lid is divided into a center lid section swivellably disposed on the vehicle body and two lateral releasable lid parts, the wind deflecting device being swivellably arranged on the center lid section, wherein the wind deflecting device can be swivelled about a transverse axis situated on the forward edge area of the center lid section, wherein the wind deflecting device includes a frame, wherein the frame includes a transversely extending frame part, and wherein a handle for swivelling the wind deflecting device is arranged on the transversely extending frame part.

9. Convertible according to claim 8, wherein the handle is a loop which points upward in the inoperative position of the wind deflecting device.

10. A convertible having a folding top compartment lid and a wind deflecting device which is arranged on the folding-top compartment lid and can be swivelled about a transverse axis from an inoperative position from a top side of the folding-top compartment lid into an upwardly directed operative position, wherein the folding-top compartment lid is divided into a center lid section swivellably disposed on the vehicle body and two lateral releasable lid parts, the wind deflecting device being swivellably arranged on the center lid section, wherein one end area of each lateral lid part is held in position by adjoining vehicle parts, and wherein each lateral lid part is fixed on the vehicle body on another end area by a releasable detent connection.

11. Convertible according to claim 10, wherein each lateral lid part includes a forward end area, and wherein the detent connection is provided on the forward end area of each lateral lid part.

12. Convertible according to claim 10, wherein the lid parts have on their rearward end, in each case at least one inwardly directed lengthening by means of which the lateral lid parts are loaded in the downward direction by adjoining edges of the closed center lid section.

13. Convertible having a folding top compartment lid and a wind deflecting device which is arranged on the folding-top compartment lid and can be swivelled about a transverse axis from an inoperative position from a top side of the folding-top compartment lid into an upwardly directed operative position, wherein the folding-top compartment lid is divided into a center lid section swivellably disposed on the vehicle body and two lateral releasable lid parts, the wind deflecting device being swivellably arranged on the center lid section, wherein the center lid section has holding elements on its back side for storing the lateral lid parts.

* * * * *